(12) United States Patent
Lancaster-Larocque

(10) Patent No.: US 8,717,132 B2
(45) Date of Patent: May 6, 2014

(54) UNIBODY MAGNET

(71) Applicant: Apple Inc., Cupertino, CA (US)

(72) Inventor: Simon Regis Louis Lancaster-Larocque, Gloucester (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/626,881

(22) Filed: Sep. 26, 2012

(65) Prior Publication Data

US 2013/0176091 A1 Jul. 11, 2013

Related U.S. Application Data

(66) Substitute for application No. 61/584,373, filed on Jan. 9, 2012.

(51) Int. Cl.
*H01F 7/02* (2006.01)

(52) U.S. Cl.
USPC .......................................... 335/306; 335/207

(58) Field of Classification Search
USPC ........................................................ 335/306
See application file for complete search history.

(56) References Cited

U.S. PATENT DOCUMENTS

| 4,839,059 | A  | * | 6/1989  | Leupold ........................ 335/210 |
| 7,541,907 | B2 | * | 6/2009  | Wang et al. .................... 335/305 |
| 7,583,500 | B2 | * | 9/2009  | Ligtenberg et al. ...... 361/679.27 |
| 7,750,781 | B2 | * | 7/2010  | Fullerton et al. .............. 335/306 |
| 7,839,044 | B2 |   | 11/2010 | Oki |
| 7,843,297 | B2 | * | 11/2010 | Fullerton et al. .............. 335/306 |
| 7,852,621 | B2 | * | 12/2010 | Lin et al. .................. 361/679.02 |
| 7,900,845 | B2 |   | 3/2011  | Stagg |
| 8,138,869 | B1 | * | 3/2012  | Lauder et al. ................. 335/219 |
| 8,395,465 | B2 | * | 3/2013  | Lauder et al. ................. 335/219 |
| 2010/0308679 | A1 | | 12/2010 | Yamashita et al. |
| 2011/0273252 | A1 | | 11/2011 | Kikugawa et al. |

FOREIGN PATENT DOCUMENTS

EP 1028437 B1 5/2006

* cited by examiner

*Primary Examiner* — Shawki S Ismail
*Assistant Examiner* — Lisa Homza
(74) *Attorney, Agent, or Firm* — Womble Carlyle Sandridge & Rice LLP

(57) ABSTRACT

A method for plating magnets with metal is disclosed. In one embodiment, the metal is aluminum and the aluminum plating provides a number of aesthetic and structural advantages, over brittle magnetic materials, which are only plated with a thin, anti-corrosive metallic layer. More specifically, methods for creating multi-pole bar magnets and structural elements primarily with aluminum coated magnetic material are disclosed.

11 Claims, 8 Drawing Sheets

UNIBODY MAGNET

CROSS-REFERENCE TO RELATED APPLICATION

This application claims priority under 35 U.S.C. 119(e) to U.S. Provisional Patent Application No. 61/584,373, filed Jan. 9, 2012, and entitled "UNIBODY MAGNET" by Lancaster-Laroque which is incorporated herein by reference in its entirety and for all purposes.

BACKGROUND

1. Field of the Invention

The present invention relates generally to alternative coatings for rare earth magnets. More specifically the plating of rare earth magnets with aluminum is discussed.

2. Related Art

Rare earth magnets such as for example neodymium magnets require some sort of sealant to prevent corrosion of the surface of the magnet. Some common magnet coatings include nickel, silver, and gold. A nickel-copper-nickel coating is perhaps the most prevalent, and in most applications is applied at a thickness of about 30 microns. The layer of plating prevents oxygen and humidity from corroding the surface of the neodymium magnets. Neodymium magnets, and generally all rare earth magnets, are quite brittle, requiring careful handling even after a sealing coating is applied. Unfortunately, the selection of surface coatings is somewhat limited, and in many cases adversely affects the external aesthetics of a consumer product. For example, a shiny nickel surface arranged along the surface of a device that had an otherwise dull, or matted surface finish, would be a poor fit.

Therefore, what is desired is a magnet surface coating which can be adapted to match the overall look, shape, and feel of the device to which it is attached.

SUMMARY

This paper describes various embodiments that relate to apparatus, and a method of manufacture related to aluminum clad magnetic components.

In a first embodiment a multi-pole magnet assembly is disclosed. The multi-pole magnet assembly includes at least: (1) a number of magnets configured in a multi-polarity arrangement, each of the number of magnets including a magnetic element, a first adhesion layer in direct contact with the magnetic element, and a second adhesion layer in direct contact with at least one portion of the first adhesion layer and joining the magnet to at least one other of the number of magnets; (2) an aluminum cladding layer in direct contact with the first adhesion layer of each of the plurality of magnets, and (3) an anodization layer in direct contact with the aluminum cladding layer, wherein at least three consecutively arranged magnets of the plurality of magnets are arranged in a first polarity pattern.

In another embodiment a magnetic component is disclosed. The magnetic component includes at least the following: (1) a magnetic element; (2) a first adhesion layer in direct contact with the magnetic element; (3) an aluminum cladding layer in direct contact with the first adhesion layer, the first adhesion layer arranged to fix the metallic cladding to the magnetic element; and (4) an anodization layer in direct contact with the metallic cladding layer, the anodization layer integrally formed with the aluminum cladding layer.

In yet another embodiment a method for cladding a magnetic element in aluminum is disclosed. The method includes at least the following steps: (1) applying a thin metallic substrate across a surface portion of a demagnetized magnetic element; (2) coating the thin metallic substrate with an aluminum cladding layer, wherein the thickness of the aluminum cladding layer is at least twice as thick as the thin metallic substrate; (3) applying an anodization layer to the aluminum cladding layer; and (4) magnetizing the demagnetized magnetic element.

BRIEF DESCRIPTION OF THE DRAWINGS

The embodiments will be readily understood by the following detailed description in conjunction with the accompanying drawings, wherein like reference numerals designate like structural elements, and in which.

DETAILED DESCRIPTION OF EXAMPLE EMBODIMENTS

Figure 1:
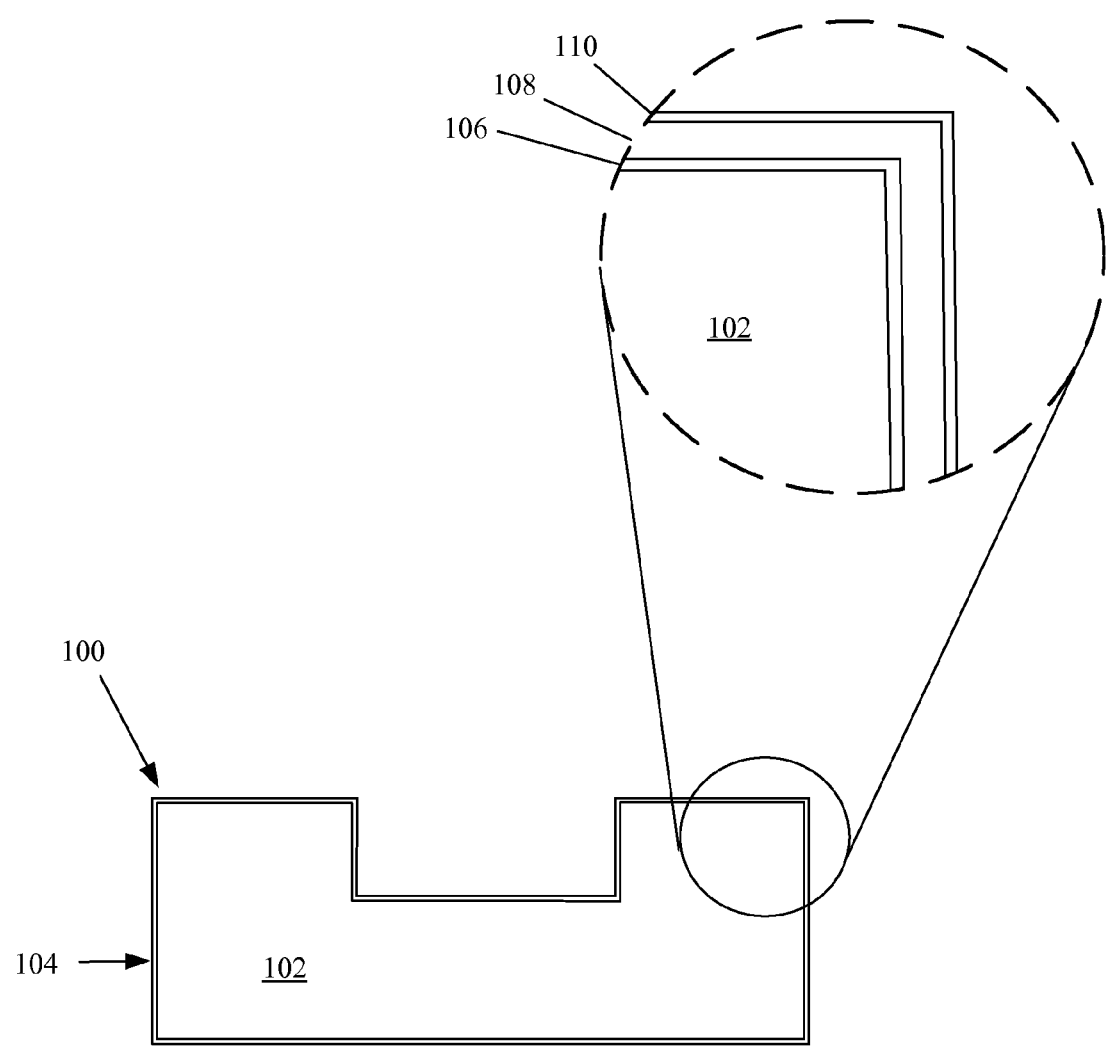
FIG. 1 shows a cross sectional view of a magnetic component having a number of metal layers.

Representative applications of methods according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Permanent magnets made of rare earth elements produce strong magnetic fields and have significant advantages over ferrite or alnico magnets. Currently the strongest type of rare earth magnet is made from a sintered neodymium alloy including neodymium, iron, and boron. The introduction of more powerful permanent magnets has allowed a much larger range of applications to be filled by permanent magnets in modern products. Motors in cordless tools, hard disk drives, and magnetic fasteners all benefit from recent advances in this technological field. In addition to superior field strength, the magnetic fields of rare earth element can be directed and shaped with much more precision than is possible with other types of magnet. Unfortunately, rare earth magnets in particular are quite brittle and susceptible to cracks and shearing if not handled with care. Additionally, many types of rare earth magnets are susceptible to surface corrosion when exposed to the atmosphere.

Surface corrosion problems with magnets are substantially ameliorated with the help of a proper surface coating. Typically, magnets are coated in magnetic metals, such as nickel, gold or even silver. Magnetic metals are most common, since a non-magnetic metal coating creates something commonly called an air gap around the magnet. The air gap will generally cause a slight drop in field strength for the magnet. In more traditional permanent magnets this was highly undesirable as any strength reductions in an already weak field were highly undesirable. Today, nickel-copper-nickel coating is a common coating, and in most applications is applied at a thickness of about 30 microns. The nickel surface prevents oxygen and humidity from corroding a surface portion of neodymium magnets.

Unfortunately, as described above the selection of surface coatings is somewhat limited, and in many cases can adversely affect the external aesthetics of a consumer product. For example, juxtaposing a magnet having shiny nickel finish on a matte aluminum surface can cause a serious aesthetic distraction. One solution to this problem is to plate the magnet with a layer of nickel, and then to subsequently plate the layer of nickel with aluminum. In this way, the aluminum coated magnet can blend in with the underlying aluminum surface.

While the preceding discussion has been generally focused on aesthetic improvements derived from an aluminum clad neodymium magnet, there are substantial structural benefits as well. Because magnets, and rare earth magnets in particular are quite brittle they typically must be supported by a protective housing. By plating a magnet with a thick layer of aluminum, typically on the order of about 500 microns, the ductility and malleability of aluminum serves as a protective layer to insulate the normally brittle magnet from a majority of externally inflicted shocks or impacts. An aluminum coating of greater than 500 microns can also allow limited machining operations to be performed once the aluminum coating is applied. For example, in one embodiment a chamfered corner feature can be added by the machining operation. When an aluminum layer is used primarily as a cosmetic surface the thickness can be on the order of about 100 microns in thickness. Another way to influence a final shape of a cladded magnet is by Computer aided machining techniques combined with cutting tools such as diamond saws, and wire electronic discharge machining which can allow precision shapes to be created from brittle neodymium magnets. Once a magnet is shaped to match a structural element it can be coated in nickel and then aluminum. The aluminum coating can give the magnet the strength to withstand an amount of stress equivalent to an amount of stress generally expected of structural members.

In one specific embodiment a multi-pole magnet can be assembled. The multi-pole magnet can be constructed by arranging a number of magnets together consecutively. In some cases the magnets can be aligned in a linear fashion. Adjacent magnets can be configured to have alternating polarities creating a polarity pattern. Adjacent magnets can be adhesively coupled together along conformal surfaces of the magnets, allowing the magnets to be arranged in a single magnetic structure. After the magnetic structure is formed it can be coated in aluminum. Thicker aluminum coatings allow the resulting multi-pole magnet to have increasing amounts of structural stability due to aluminum's having both ductile malleable properties. However, it should be noted that thicker coatings of aluminum can result in an air gap between the underlying magnets and whatever surface the multi-pole magnet will be attached to. Consequently, a careful balance can be reached for any such embodiment balancing strength against magnetic attenuation. Finally, surface finishing techniques can be applied to Various embodiments of both structural and aesthetic metallic coatings for rare earth magnets are discussed below with reference to FIGS. 1-6. However, those skilled in the art will readily appreciate that the detailed description given herein with respect to these figures is for explanatory purposes as the full extent of the embodiments goes beyond these limited descriptions.

FIG. 1 shows coated magnetic assembly 100. Coated magnet assembly 100 has magnet 102 in direct contact with surface coating 104. Surface coating 104 can seal the surface of magnet 102 from environmental impacts such as corrosion. For example, surface coating 104 can prevent atmospheric gases from coming in contact with magnet 102, thereby preventing oxidation or corrosion of the surface of magnet 102. Surface coating 104 can take many forms. For example, surface coating 104 can include a number of layers of different materials. In the implementation shown in FIG. 1, surface coating 104 can be made up of the following three layers: adhesion layer 106; metallic cladding layer 108; and protective surface layer 110. Adhesion layer 106 has properties allowing it to seal the surface of magnet 102 from the atmosphere, adhere well to the surface of magnet 102, and act as an adhesive substrate for metallic cladding layer 108. In one embodiment adhesion layer 106 can be made from a thin layer of Nickel, typically about 30 microns in thickness. Metallic cladding layer 108 will generally match the surface of the device upon which it will be installed. The thickness of the metallic cladding layer will depend upon the thickness of the desired protective surface layer 110, and upon the amount of support it must provide to the overall structural integrity of coated magnetic assembly 100. For example, when metallic cladding layer 108 is aluminum a minimum thickness of 75 microns is required; however, when coated magnetic assembly 100 is laser etched about 500 microns is generally required to provide the necessary depth. An even thicker layer may be required when coated magnetic assembly 100 will be subjected to external stresses not generally supportable by the brittle consistency of many rare earth element magnets. Finally, protective surface layer 110 is the outer surface of coated magnetic assembly 100. Protective surface layer 110 can be produced by applying finishing processes to the surface of magnetic cladding layer 108. In the previously used example of an aluminum cladding layer sand blasting and anodizing techniques can be used to create a specific finish and toughen the outer layer of coated magnetic assembly 100. Finishing processes should remove no more than about 20 microns from the thickness of coated magnetic assembly 100.

Accordingly surface coating 104 can include an adhesion layer 106 made of nickel which can be applied directly to magnet 102 through an electroplating process in a first step. The nickel layer is applied first as aluminum does not electroplate to magnetic material. An aluminum cladding layer can then be adhered to the nickel layer in a second step, also using an electroplating process. In one embodiment, protective surface layer 110 shown in FIG. 1 is made of aluminum oxide ($Al_2O_3$). In one embodiment this final layer does not need to be plated onto the magnet, as it can be formed naturally as a consequence of elemental aluminum being exposed to the atmosphere; however, a controlled release of oxygen onto the aluminum surface can help to control the properties of protective surface layer 110. In such an embodiment, protective surface layer 110 is an aluminum oxide layer; the aluminum oxide layer seals the surface of aluminum layer and maintains a robust barrier that makes corrosion quite difficult. A variety of surface treatments such as for example sand blasting can be applied to the aluminum oxide layer, making it identical in surface appearance to any other similarly treated aluminum component. Aluminum oxide layer 110 can also be anodized to further toughen the aluminum surface, thereby making it better able to withstand inadvertent nicks and scratches. Given a thick enough layer of aluminum, processes such as laser engraving can even be performed (typically at least 500 microns in thickness is used with laser engraving). The neodymium magnet is not generally magnetized until after all the surface coatings have been added. This is because many plating processes are typically performed above room temperature and exposing charged magnets to increased temperature can degrade the strength of the magnetic field. Although, most magnets do not see significant permanent field strength reduction below 80° C., manufacturers generally leave the magnetizing step until the end.

Figure 2A:
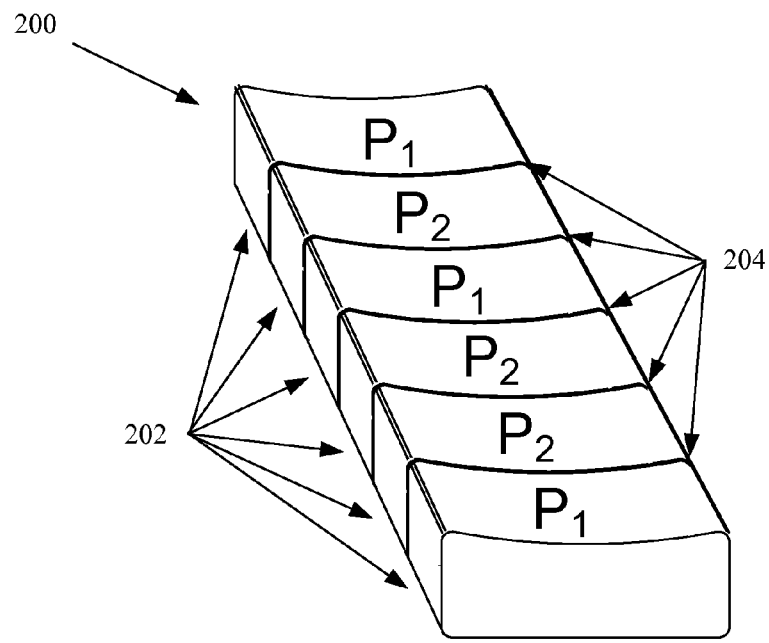
FIG. 2A shows a number of magnets adhesively coupled together.

FIG. 2A shows a first arrangement 200 of magnets 202 thickly plated in accordance with the previously described embodiment. First arrangement 200 can include any number of magnets 202 arrange in any order of polarity, consecutively arranged side by side. Variation in the polarity of the magnetic poles can create a magnetic code, when coupled with another set of similarly arranged magnets. In some cases a polarity pattern can be $P_1, P_2, P_1$, as depicted, while another polarity pattern can be $P_2, P_2, P_1$. In other embodiments magnets 202 can also be of different lengths, thereby further increasing a complexity aspect of the polarity pattern. While only two specific examples have been given this disclosure should be understood to apply to any arrangement of polarities or number of individual magnets associated with a polarity pattern. Furthermore, magnetic field strength of magnets 202 can also be varied between magnets 202 as a part of a polarity pattern.

Figure 2B:
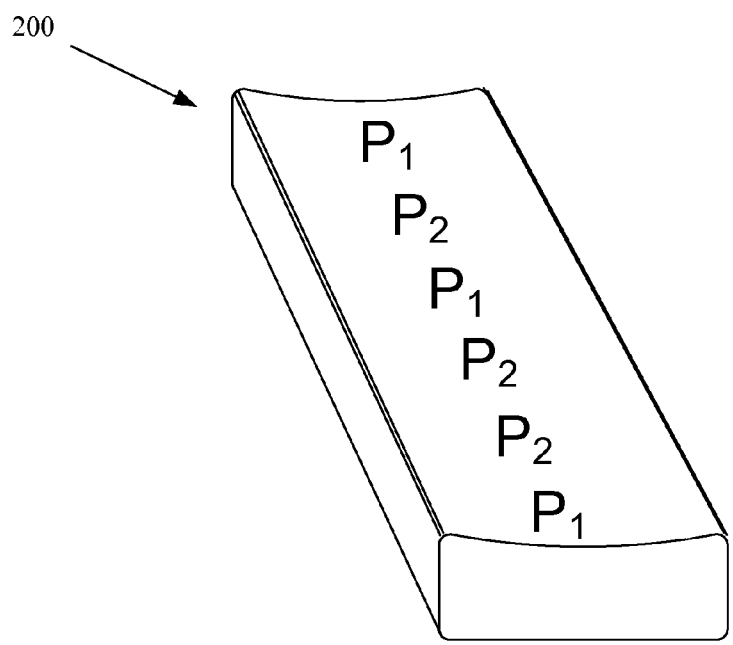
FIG. 2B shows the magnets from FIG. 2A after an aluminum cladding layer has been applied to it.

These types of magnetic coding arrangements can be effective in an embodiment in which two pieces of a device need to be temporarily joined in a precise manner. Since the magnetic coding can be configured so that only allows one possible attachment position is possible, sloppy or irregular attachments can be avoided. When magnets of opposing polarity are arranged next to one another repulsive forces are created between the magnets themselves. In one embodiment these forces can be overcome by applying an adhesive layer between adjacent surfaces 204. In this particular case the magnetizing step can be completed before the adhesion and aluminum plating steps, as an early magnetization step removes the need for the creation of complex and costly magnetic fields necessary to subsequently create a single multi-pole magnet. Any resulting adverse effect on magnetic field strength can be nominal at most, since the electroplating step can be conducted well below the 80° C. Moreover, as illustrated in FIG. 2B this configuration results in a consistent, continuous surface finish for both the magnet and its housing; the aluminum coating also functions to conceal any discontinuity between adjacent surfaces of magnets 202 thereby creating a smooth, cosmetically pleasing, and uniform surface.

Figure 3A:
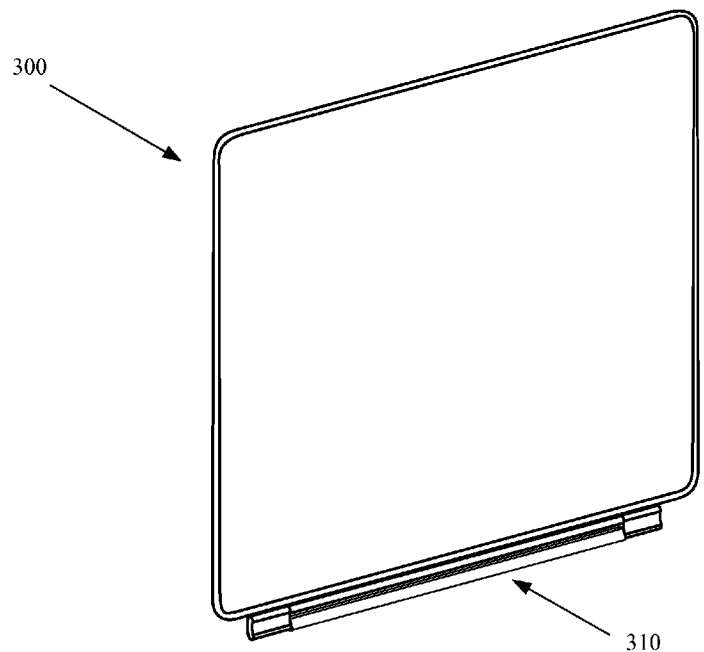
FIG. 3A shows an exemplary device that can to which previously described embodiments can be applied.
Figure 3B:
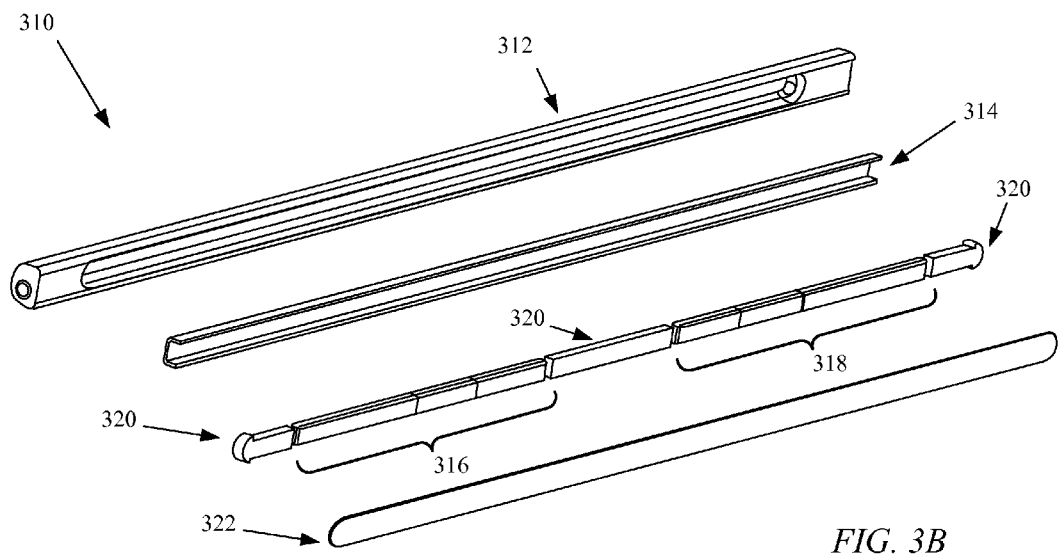
FIG. 3B shows an existing configuration of the exemplary device of FIG. 3A.

FIGS. 3A-3D shows an embodiment of the described embodiment. FIG. 3A shows accessory 300. Accessory device 300 can take many forms. In the example shown in FIG. 3A, accessory 300 takes the form of a protective cover that can be used in conjunction with a portable electronic device such as a tablet computer. Accordingly and without loss of generality, accessory device 300 takes the form of protective cover 300 that can be used to protect a tablet device (not shown) with tablet cover attachment mechanism 310. Tablet cover attachment mechanism 310 can be used to hingedly attach generic tablet cover 300 to a tablet device. In FIG. 3B an exploded view of tablet cover attachment mechanism 310 is shown. For exemplary purposes tablet cover attachment mechanism 310 will resemble the design found on the Smart Cover®, manufactured by Apple Inc. of Cupertino, Calif.; however, it should be understood that this design could be applied to any magnet housing component, and this specific reference should not constitute any loss of generality. FIG. 3B includes the following: magnet housing 312; metal shunt 314; magnet arrays 316 and 318; spacers 320; and bumper 322. Magnet housing 312 keeps metal shunt 314 in place. Magnet arrays 316 and 318 are kept laterally in place by non-magnetic spacers 320 and covered up by bumper 322. Magnet arrays 316 and 318 are arranged using magnets with alternating magnetic fields, in much the same way as described in relation to FIGS. 2A and 2B. Metal shunt 314 helps direct the magnetic fields of magnet arrays 316 and 318 towards the attachment point of the tablet device to which it will be attached. Finally, bumper 322 is used to conceal magnet arrays 316 and 318. Bumper 322 hides the shiny surfaces of magnet arrays 316 and 318 caused by the metallic coating used on magnet arrays 316 and 318. The addition of bumper 322 allows a more consistent, cosmetically pleasing surface where magnet housing 312 has a more subdued finish such as for example a brushed, or matted aluminum surface finish.

Figure 3C:
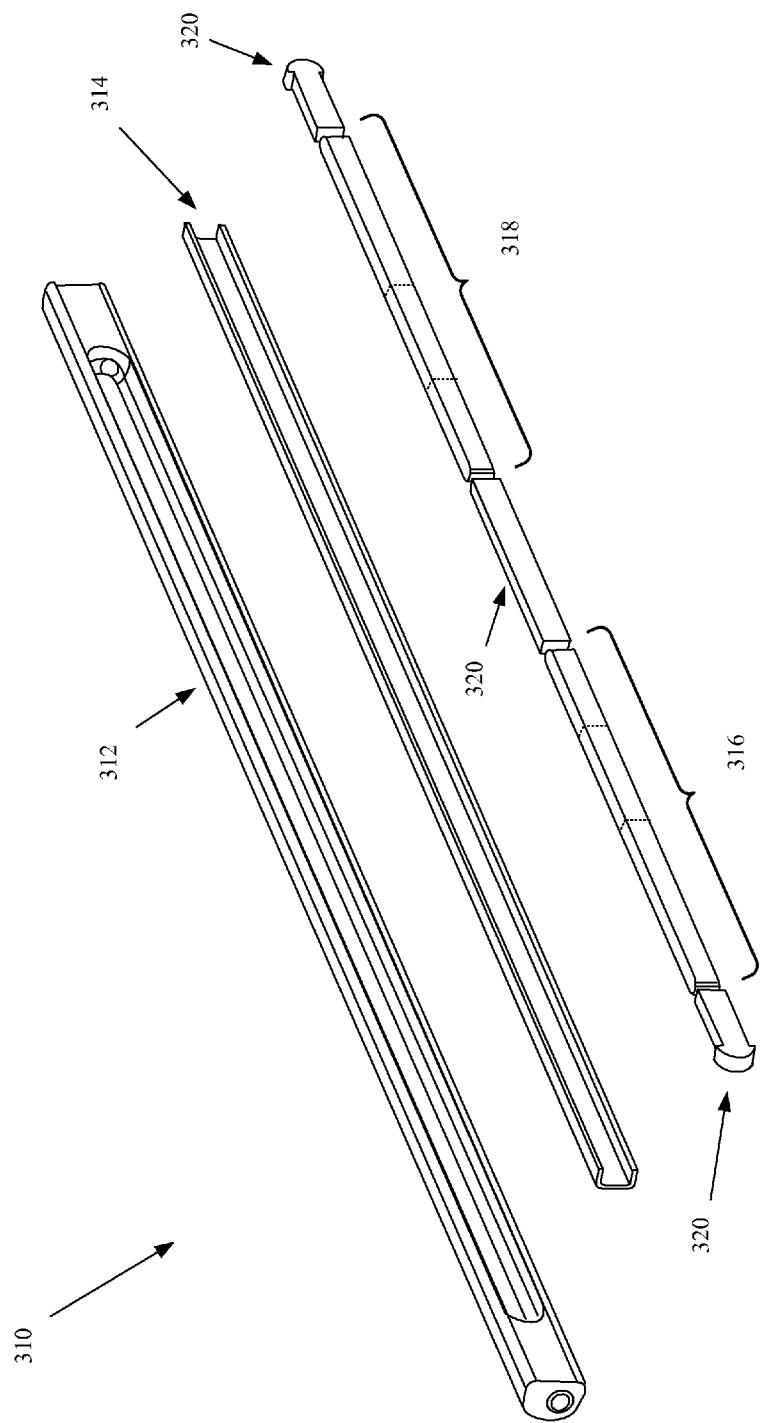
FIG. 3C shows an alternate configuration of the embodiment of FIG. 3B in which aluminum cladding is applied to cover discontinuities between magnets.

FIG. 3C shows another embodiment of the design shown in FIG. 3B. Here magnet arrays 316 and 318 have been coated with aluminum (separation of the magnets inside the aluminum coating are shown by dotted lines). This effectively removes discontinuities between the magnets and replaces the shiny surface of the nickel plating with aluminum plating that can be finished to precisely match an aluminum magnet housing 312. When spacers 320 are made of aluminum blocks as well, bumper 322 (not shown) can be omitted, as nearly the entire surface of tablet cover attachment mechanism 310 is made up of aluminum. One exception is stainless steel shunt 314 which can peak around the sides of magnet arrays 316 and 318.

Figure 3D:
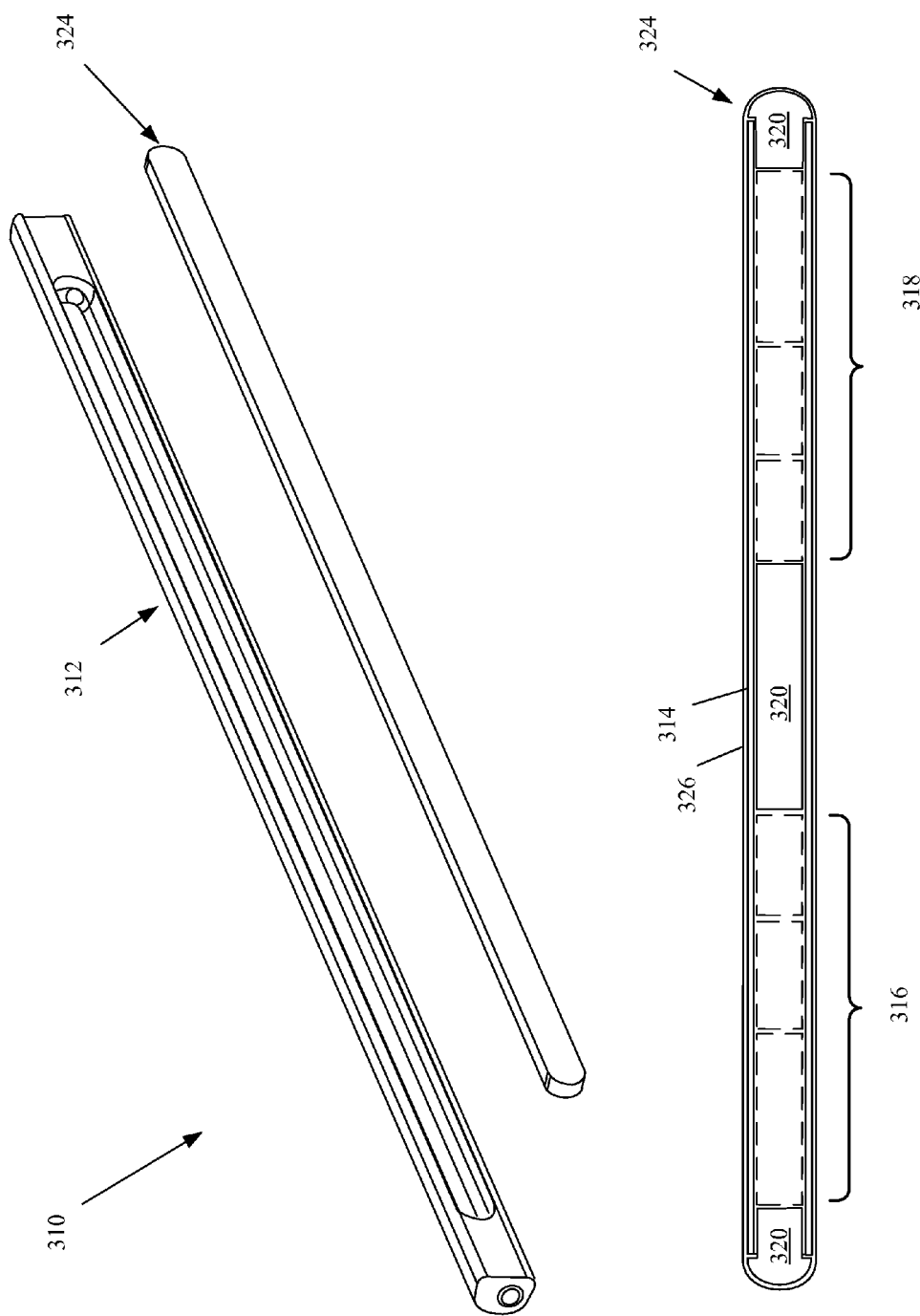
FIG. 3D shows an embodiment in which magnets are coated in aluminum together with spacers and a metal shunt.

FIG. 3D shows yet another permutation of the proposed design changes. In this configuration magnet arrays 316 and 318, metal shunt 314, and spacers 320 are all coated together in a single piece referred to as shunted magnet block 324. An interior cross section of shunted magnet block 324 is shown at the bottom of FIG. 3D. Aluminum layer 326 encloses the entire assembly. In this way a unibody magnet with numerous magnetic poles can be created. This embodiment overcomes a problem shown in FIG. 3C where metal shunt 314 can show around the edges of magnet arrays 316 and 318. This embodiment also covers discontinuities that can appear between magnet arrays 316 and 318, and spacers 320. Once shunted magnetic block 324 is inserted into magnet housing 312 only a single outline around shunted magnetic block 324 mars an otherwise seamless surface. It should be noted that while this embodiment described a complex arrangement of magnets encased in a shunt and plated with aluminum, there are other scenarios in which a single magnet can be embedded within its own shunt to provide a more modular design with more highly directed magnetic field lines. It should also be noted that although the finish of the magnet coating will typically be made to closely match a component upon which it will rest, there can be situations in which a variation on the surface finish is desirable, in order to accentuate the presence of the magnets.

Figure 4:
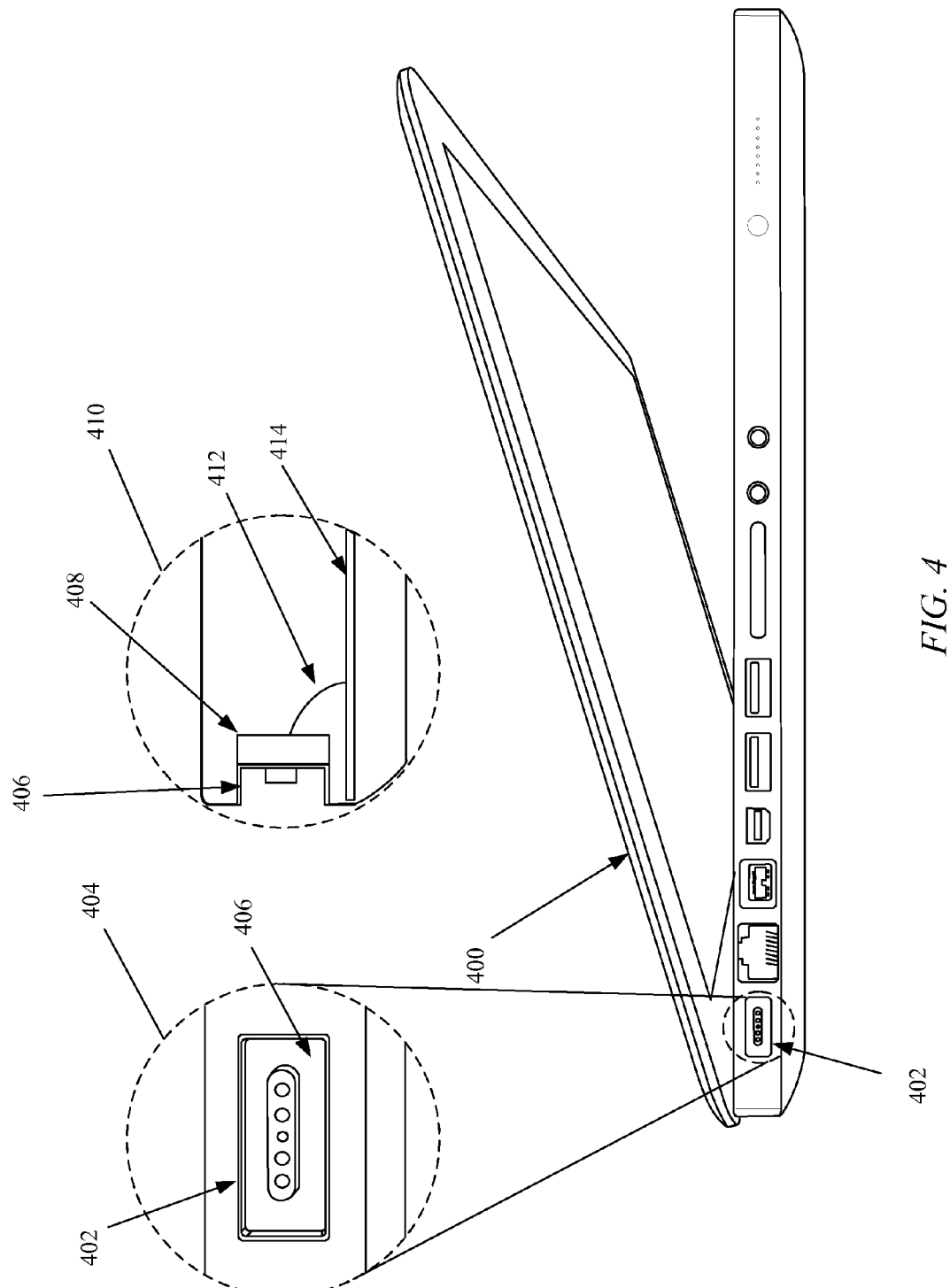
FIG. 4 shows an embodiment in which metal clad magnets can be applied to a magnetic power connector for a laptop device.

FIG. 4 shows another embodiment relating to a power connector for a laptop computer. In FIG. 4 one side of laptop computer 400 is visible. In this embodiment of the described embodiment the existing component to be modified is magnetic connector 402, similar to the MagSafe® connector, designed by Apple Inc., of Cupertino, Calif. In close up view 404 of magnetic connector 402, plastic cover 406 can be seen. Plastic cover 406 functions to obscure a disparate surface of metallic plated magnet 408 sitting behind it. Plastic cover 406 is generally colored to match the exterior housing of laptop computer 400. Unfortunately, when the surface of the exterior housing is made of a material such as aluminum even a gray plastic cover 406 will never completely blend in. Close up view 410 shows another view of magnetic connector 402 shifted 90 degrees right of close up view 404. In close up view 410 metallic plated magnet 408 can be seen sitting directly behind plastic cover 406. Electrical conduit 412 is also shown attaching magnetic connector 402 to circuit board 414. If metallic plated magnet 408 is coated in aluminum in accordance with the described embodiment, then any aesthetic necessity for obscuring the magnet is now overcome. In one embodiment if plastic coating 406 is still desired to reduce the occurrences of scratching due to metal on metal contact, then the plastic can be transparent allowing the interior of magnetic connector 402 to appear as an extension of the remainder of the laptop housing.

While the preceding discussion has been generally focused on aesthetic improvements derived from an aluminum clad neodymium magnet, there are substantial structural benefits as well. Because magnets and rare earth magnets in particular are quite brittle they typically must be supported by a protective housing. By plating a magnet with a sufficiently thick layer of aluminum, typically on the order of at least 500 microns, the ductility and malleability of aluminum serves as a protective layer to insulate the normally brittle magnet from a majority of external shocks or impacts. Computer aided machining techniques combined with cutting tools such as diamond saws, and wire electronic discharge machining allow precision shapes to be created from brittle neodymium magnets. Once a magnet is shaped to match a structural element it can be coated in nickel and then aluminum, in accordance with the described embodiment. The aluminum coating gives the magnet the strength to withstand any potential abuse a structural member can absorb.

Figure 5:
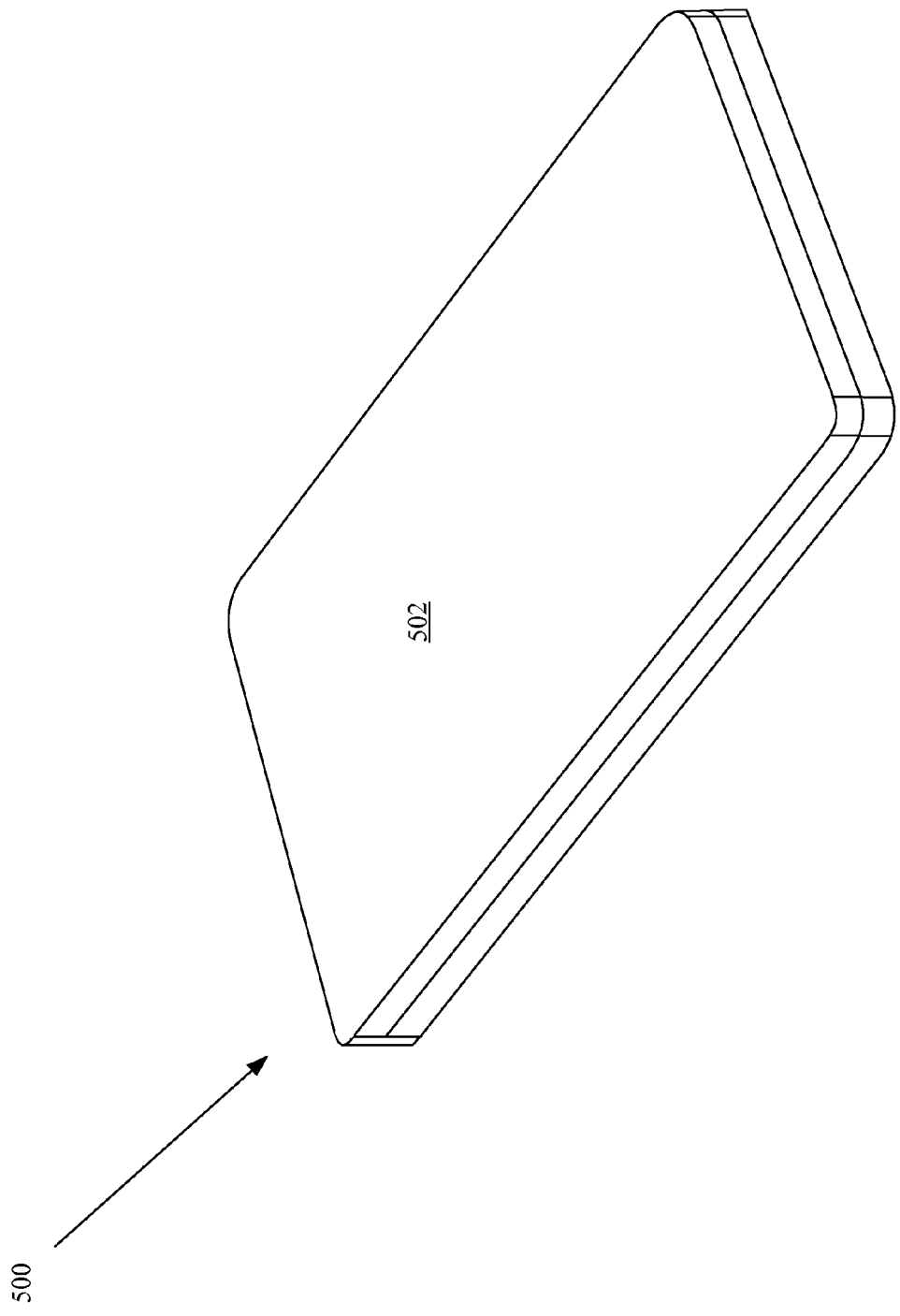
FIG. 5 shows a portable electronic device having a magnetic rear housing.

FIG. 5 shows portable electronic device 500. Portable electronic device 500 has rear housing 502 which is a magnet structural element 502. Magnet structural element 502 is plated with a layer of aluminum in order to convert the otherwise brittle magnet structure into a more robust structural element. By designing portable electronic device 500 with a backing made mainly of magnetic material a uniform magnetic field can be produced which allows attachment of portable electronic device 500 to a number of different surfaces, including for example, refrigerators, metallic armbands, or even a wall mounted docking station. By spreading the magnetic surface over a wide area the density of the field can be reduced while maintaining enough overall attractive force to support the device on nearly any surface. The less powerful field can be desirable where concerns about magnetic interference are at issue. It should be noted that in some embodiments only a certain portion of rear housing 502 is made from magnetic material, only enough to allow attachment to a targeted surface. A remainder of rear housing 502 can be another structurally robust material that can receive an aluminum coating.

Figure 6:
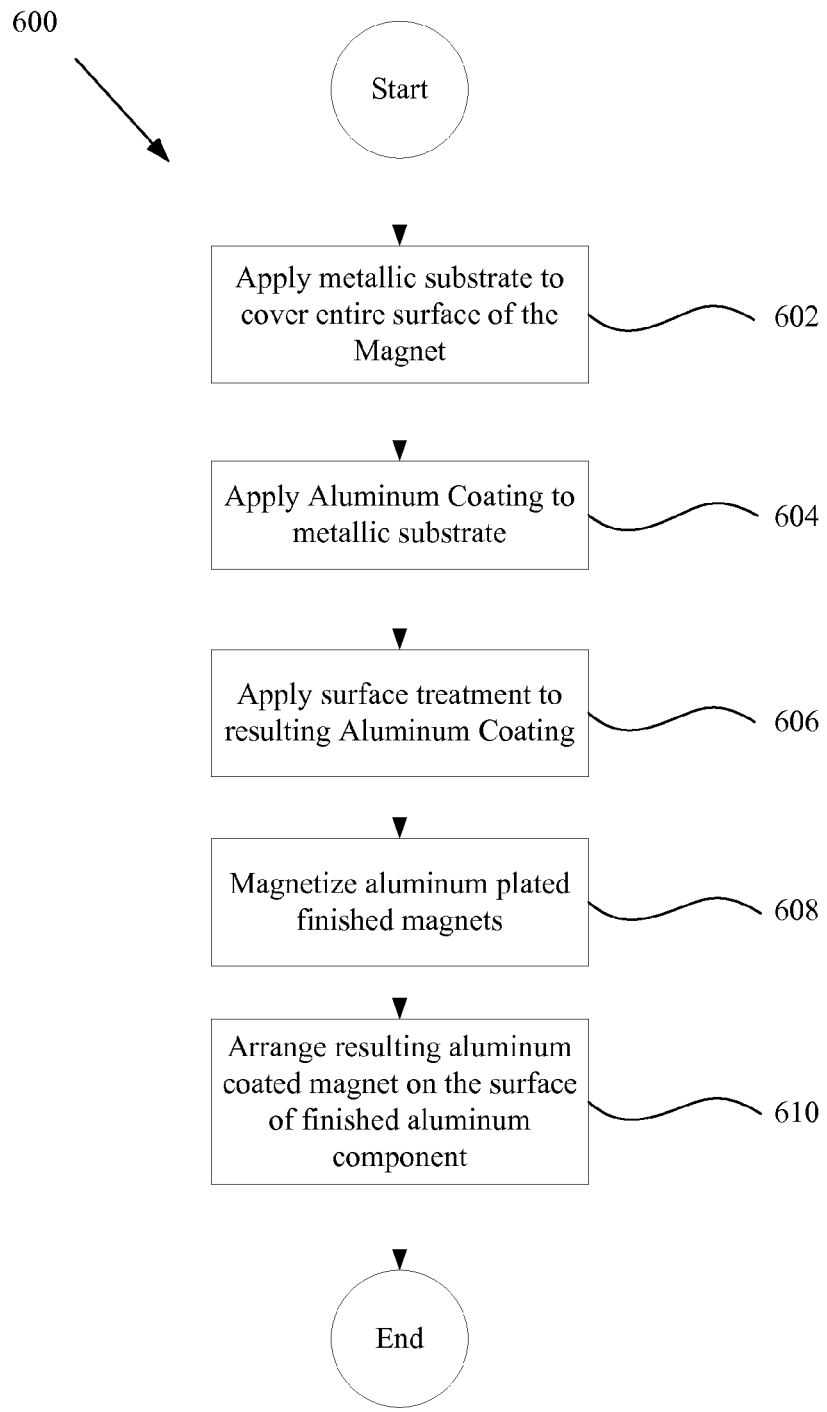
FIG. 6 shows a flowchart describing a manufacturing process for producing metal clad magnets.

FIG. 6 shows a flowchart detailing manufacturing process 600 for producing metal clad magnets. In step 602 a magnet is coated with a thin metallic substrate. The magnet can be a demagnetized rare earth magnet capable of being magnetized with a strong magnetic field. The thin metallic substrate is generally made of any metal coating that when plated across an entire surface of the magnet is capable of preventing corrosion of the magnet. In step 604 the metallic coating is covered with a second metal coating such as aluminum that is well suited to be plated to the thin metallic substrate. In step 606 the newly clad aluminum magnet receives a surface treatment. In some cases the surface treatment is created by releasing a controlled stream of oxygen across a surface portion of the second metal coating, thereby providing a substantially uniform Aluminum Oxide layer. In other embodiments a specifically formulated anodization layer can be applied in conjunction with a number of surface texturing treatments designed to help the finished clad magnet to blend into whatever surface it will be a part of. In step 608 once the magnet has been coated and surfaced the magnet receives a magnetic charge. By waiting till the end to magnetize the magnet a loss of magnetic field strength associated with heat production in the cladding process can be avoided. Finally in step 612 the magnet can be arranged on the surface of the device it was designed to be affixed to.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A multi-pole magnet assembly, comprising:
   a plurality of magnets, each one of the plurality of magnets comprising:
      a magnetic element,
      a metallic layer in direct contact with the magnetic element, the metallic layer formed from a magnetically attractable material, and
      an adhesive layer in direct contact with at least a portion of the metallic layer and joining the magnet to at least one other of the plurality of magnets;
   a cladding layer formed from magnetically neutral metal, the cladding layer coupled to the metallic layer of each of the plurality of magnets, the cladding layer enclosing both the metallic element and the metallic layer of each of the plurality of magnets; and
   an anodization layer disposed along an outside surface of the cladding layer.

2. The multi-pole magnet assembly as recited in claim 1, further comprising:
   a non-metallic spacing element disposed between and in direct contact with a first and second magnet of the plurality of magnets.

3. The multi-pole magnet assembly as recited in claim 1, further comprising:
   a metal shunt in direct contact with the metallic layer of each of the plurality of magnets, the metal shunt configured to redirect field lines of the magnetic elements.

4. The multi-pole magnet as recited in claim 1, wherein at least two magnets of the plurality of magnets have a substantially different volumetric size.

5. The multi-pole magnet as recited in claim 1, wherein the metallic layer is made from a metal selected from the group consisting of nickel, gold, and silver.

6. The multi-pole magnet as recited in claim 1, wherein a machining operation can be applied to the cladding layer to alter a final shape of the multi-pole magnet.

7. The multi-pole magnet assembly as recited in claim 6, wherein the magnetic elements are arranged in a first polarity pattern, and wherein the first polarity pattern is $P_1, P_2, P_1$.

8. A magnetic component, comprising:
   a magnetic element;
   a metallic layer in direct contact with the magnetic element, the metallic layer formed from a magnetically attractable material;
   a metallic cladding layer formed from magnetically neutral material, the metallic cladding layer coupled with the metallic layer and encasing both the magnetic element and the metallic layer; and
   an anodization layer formed along an outside surface of the metallic cladding layer.

9. The magnetic component as recited in claim 8, wherein the anodization layer comprises aluminum oxide.

10. The magnetic component as recited in claim 9, wherein the metallic cladding layer is substantially thicker than the metallic layer.

11. The magnetic component as recited in claim 9, wherein the metallic layer substantially covers an outside surface of the magnetic element.

* * * * *

UNITED STATES PATENT AND TRADEMARK OFFICE
CERTIFICATE OF CORRECTION

PATENT NO.        : 8,717,132 B2
APPLICATION NO.   : 13/626881
DATED             : May 6, 2014
INVENTOR(S)       : Simon Regis Louis Lancaster-Larocque Page 1 of 1

It is certified that error appears in the above-identified patent and that said Letters Patent is hereby corrected as shown below:

In the Claims

Column 8, line 64, claim 1, the word "metallic" should be changed to --magnetic--.

Column 9, line 11, claim 4, after the word "magnet", insert the word --assembly--.

Column 9, line 14, claim 5, after the word "magnet", insert the word --assembly--.

Column 9, line 17, claim 6, after the word "magnet", insert the word --assembly--.

Signed and Sealed this
Twelfth Day of August, 2014

Michelle K. Lee
*Deputy Director of the United States Patent and Trademark Office*